US008271652B2

(12) United States Patent
Ezolt et al.

(10) Patent No.: US 8,271,652 B2
(45) Date of Patent: Sep. 18, 2012

(54) LOAD-DERIVED PROBABILITY-BASED DOMAIN NAME SERVICE IN A NETWORK STORAGE CLUSTER

(75) Inventors: Phillip G. Ezolt, Sunnyvale, CA (US); Jeffrey E. Semke, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 513 days.

(21) Appl. No.: 12/179,493

(22) Filed: Jul. 24, 2008

(65) Prior Publication Data

US 2010/0023621 A1    Jan. 28, 2010

(51) Int. Cl.
*G06F 15/173* (2006.01)

(52) U.S. Cl. .................. 709/226; 709/217; 718/105

(58) Field of Classification Search .................. 709/217, 709/226; 718/105
See application file for complete search history.

(56) References Cited

U.S. PATENT DOCUMENTS

| 6,092,178 | A  | * | 7/2000  | Jindal et al. ............... 712/27 |
| 6,119,143 | A  |   | 9/2000  | Dias et al. |
| 6,128,279 | A  | * | 10/2000 | O'Neil et al. ............ 370/229 |
| 6,813,635 | B1 | * | 11/2004 | Jorgenson ................ 709/225 |
| 6,859,834 | B1 | * | 2/2005  | Arora et al. .............. 709/227 |
| 7,086,061 | B1 | * | 8/2006  | Joshi et al. ............... 718/105 |
| 7,653,700 | B1 | * | 1/2010  | Bahl et al. ............... 709/217 |
| 7,882,501 | B1 | * | 2/2011  | Carlson et al. ........... 717/167 |
| 2002/0152322 | A1 | * | 10/2002 | Hay .......................... 709/245 |
| 2002/0194335 | A1 | * | 12/2002 | Maynard ................... 709/225 |
| 2005/0010682 | A1 |   | 1/2005  | Amir et al. |
| 2005/0154576 | A1 | * | 7/2005  | Tarui et al. ................. 703/22 |
| 2006/0235972 | A1 | * | 10/2006 | Asnis ........................ 709/225 |
| 2007/0022121 | A1 |   | 1/2007  | Bahar et al. |
| 2007/0143460 | A1 |   | 6/2007  | Ben-David et al. |

OTHER PUBLICATIONS

Rob Riepel, Stanford University "lbnamed"; downloaded on May 12, 2008: http://www.stanford.edu/~riepel/lbnamed/bof.talk/sld001. htm; Slides 1-15.
LINUXQUESTIONS.Org; "Configure BIND DNS to Answer Active Directory Queries"; downloaded on May 12, 2008: http://www.linuxquestions.org/linux/answers/Networking/Configure_BIND_DNS_to_Answer_Active_Directory_Queries; 4 pages.
"Bind and Load Balancing"; downloaded on May 12, 2008: http://www.isc.org/sw/bind/docs/bind-load-bal.php; ISC.Org; 3 pages.
D.J. Bernstein; Internet Publication; "How to Balance Load Among Many Web Servers"; downloaded on May 12, 2008: http://cr.yp.to/djbdns/balance.html; 1 page.

(Continued)

*Primary Examiner* — Duyen Doan
(74) *Attorney, Agent, or Firm* — Perkins Coie LLP

(57) ABSTRACT

DNS name resolution is integrated into each node in a network storage cluster, to allow load balancing of network addresses, using a weighted random distribution to resolve DNS requests. A node in the cluster gathers statistics on utilization of resources, such as CPU utilization and throughput, on nodes in the cluster and distributes those statistics to all other nodes. Each node uses the same algorithm to generate weights for the various IP addresses of the cluster, based on the statistics distributed to it. The weights are used to generate a weighted list of available network addresses. In response to a DNS request, a DNS in a given node randomly indexes into the weighted address list to resolve requests to a network address. The weights are chosen so that the DNS is likely to pick an IP address which has a low load, to balance port and node usage over time.

26 Claims, 5 Drawing Sheets

OTHER PUBLICATIONS

A. Gulbrandsen; Network Working Group Troll Technologies; "A DNS RR for Specifying the Location of Services (DNS SRV)"; downloaded on May 12, 2008: http://www.ietf.org/rfc/rfc2782.txt; Feb. 2000;11 pages.

Isolon Systems—Product Software Smart Connect; "Enabling Breakthrough Levels of Performance and Availability Through Client Connection Load Balancing with Failover"; downloaded on May 12, 2008: http://www.isilon.com/products/index.php?page=software_SmartConnect; 4 pages.

International Search Report of PCT Application No. PCT/US2009/051515, Feb. 25, 2010, 3 pages.

Written Opinion of PCT Application No. PCT/US2009/051515, Feb. 25, 2010, 4 pages.

* cited by examiner

LOAD-DERIVED PROBABILITY-BASED DOMAIN NAME SERVICE IN A NETWORK STORAGE CLUSTER

FIELD OF THE INVENTION

At least one embodiment of the present invention pertains to network data storage systems, and more particularly, to a technique of providing load-derived probability-based domain name service in a network storage cluster.

BACKGROUND

A network storage server is a processing system that is used to store and retrieve data on behalf of one or more clients on a network. A storage server operates on behalf of one or more clients to store and manage data in a set of mass storage devices, such as magnetic or optical storage-based disks or tapes. Some storage servers are designed to service file-level requests from hosts, as is commonly the case with file servers used in a network attached storage (NAS) environment. Other storage servers are designed to service block-level requests from clients, as with storage servers used in a storage area network (SAN) environment. Still other storage servers are capable of servicing both file-level requests and block-level requests, as is the case with certain storage servers made by NetApp, Inc. of Sunnyvale, Calif.

To service a large-scale system with high throughput requirements, multiple storage servers can be connected together to form a storage cluster. A cluster architecture provides improved scalability. In a cluster architecture, each storage server is called a storage server node, or simply a "node". A storage cluster typically has multiple network addresses, such as Internet Protocol (IP) addresses, any of which can be accessed by a client to service a request. A node in a storage cluster has one or more ports, and IP addresses can reside on one or more of those ports.

In one known storage cluster architecture, a client sends a request to a designated storage server node via a particular port and IP address. That storage server node may service the request itself, or it may forward the request to another node in the cluster. An example of a cluster-oriented network storage system that has these features is the Data ONTAP GX system from NetApp.

Two protocols commonly used by clients to access data over a storage network are network file system (NFS) and common internet file system (CIFS). With NFS or CIFS, to initially gain access to stored data, a client "mounts" a network share by accessing an IP address. To mount a share, a client either specifies an IP address directly or it provides a host name which a DNS (domain name server/service) translates into an IP address. The client then establishes a connection to that IP address and sends a mount request/command in a well-known format to mount the share. Once the share has been mounted with a particular IP address, that IP address is used by the client until the share is unmounted.

In a storage cluster, the network traffic can become unbalanced across the various IP addresses of the cluster as a storage cluster operates. Ideally, when a client is about to mount a share, it would choose the IP address available for that share which is on the least loaded port/node in the cluster. However, many storage cluster architectures do not provide a client with any help to choose the IP address which is on the port/node with the smallest load. Others do so in a way which is not optimal.

The most commonly used DNS on the Internet today is the Berkeley Internet Name Domain (BIND). By default, BIND provides a round-robin mechanism to select from a list of IP addresses when given a particular DNS zone name. When a request comes in to resolve a name, BIND will return a list of all IP addresses that can resolve that name. However, it will rotate the order of the entries in the list. If the client receives the list in that order, and always selects the first entry, then client mounts should be balanced.

However, when using BIND, the user's DNS infrastructure may reorder the list between the time it leaves the server and arrives on the client. Such reordering can erroneously cause all clients to choose the same IP address to mount. Furthermore, even if BIND hands out each of the IP addresses evenly and they are perfectly balanced, that may still result in unbalanced loading, since some ports (on which the IP addresses reside) may have more capacity available than others.

BIND also provides a mechanism for using service ("SRV") records to do load balancing, including the ability to specify statically the probability of returning a given node. Specifically, an SRV record can associate a hostname with a priority value that represents the priority of the target host, and a weight value that represents a relative weight for records with the same priority. However, SRV records cannot be dynamically updated in response to a given load. Furthermore, at present they are an experimental feature that are not used to resolve the DNS requests that most users use.

Isilon Systems provides a DNS with a feature called SmartConnect, which is described as having the ability to perform client connection load balancing. The SmartConnect approach is understood to maintain a single DNS server within a cluster. As such, if the node operating the DNS fails, then the name service fails. Also, the ability to handle increased DNS load does not scale with the addition of more nodes to the cluster. Further, this approach is partially based on returning round-robin results which, depending on the implementation, can necessitate a large amount of communication between different nodes in a cluster.

Another known load-balancing name server is "lbnamed". With lbnamed, weights are applied to IP addresses and are dynamically updated based on loading. The lowest weighted IP address is always returned. However, the lbnamed solution also uses a single DNS to adjust the weights after each request, which undesirably provides a single point of failure. In addition, the load calculation used by lbnamed makes weighting decisions based on parameters such as load averages, total users, unique users, boot time, current time, etc. These parameters may be suitable for load balancing workstation utilization, but are not suitable for balancing individual port utilization.

Another known DNS is "TinyDNS". The TinyDNS server returns a random list of eight servers which can fulfill the requests. TinyDNS provides a random return, but it does not allow certain IP addresses to be weighted. The decision to return an IP address is binary, i.e., it is returned or it is not.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
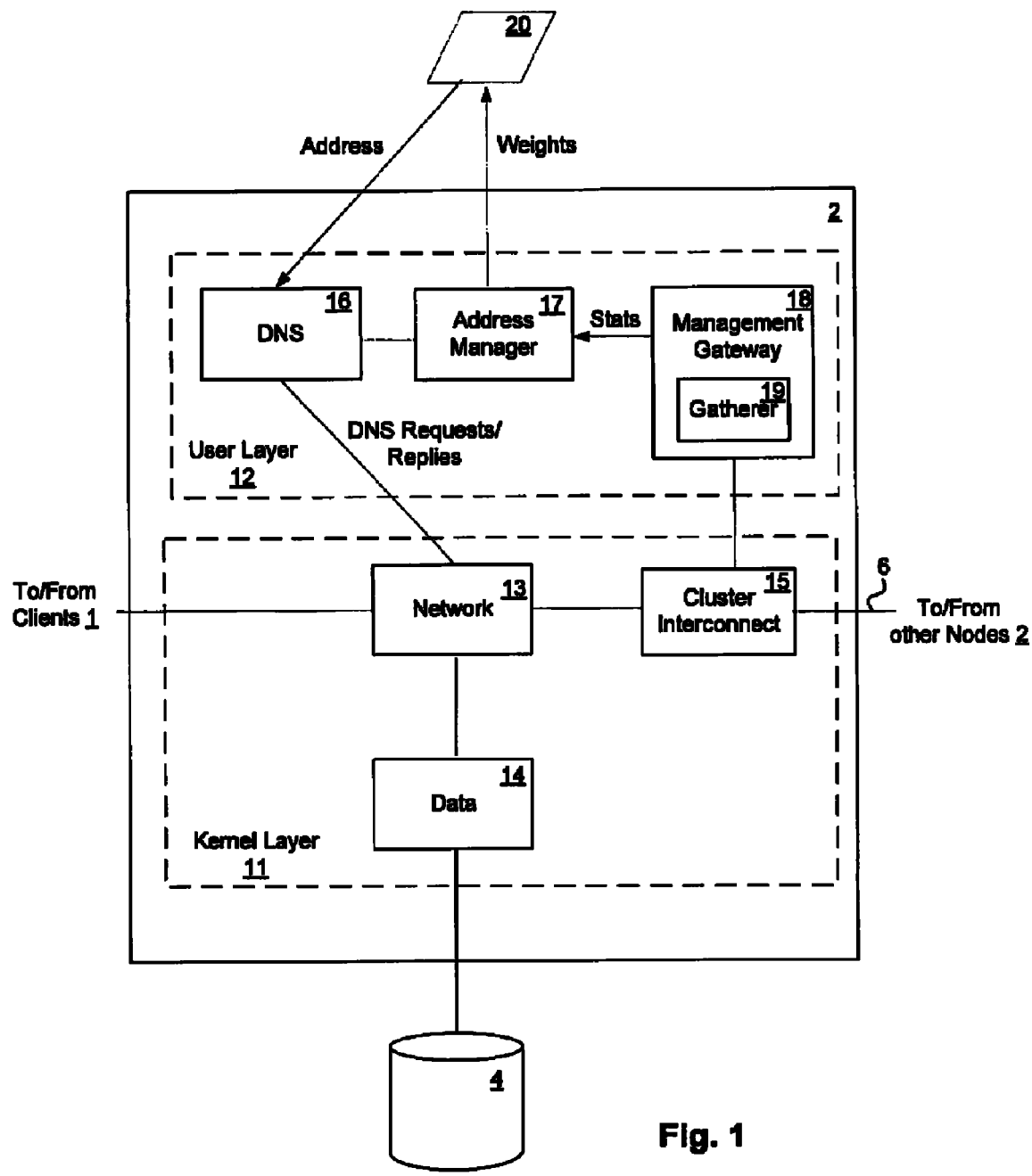
FIG. 1 illustrates a storage server node that can be implemented in a network storage cluster.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A method and apparatus for load-derived, probability-based DNS in a network storage cluster are introduced here. The technique introduced here integrates DNS name resolution into each storage server node in a storage cluster. It allows the cluster to control the IP addresses that clients will mount in the cluster by using a weighted random distribution to resolve client DNS requests, to balance resource utilization across the various ports/nodes in the cluster.

As described further below, one of the nodes in the cluster gathers statistics relating to central processing unit (CPU) utilization and throughput for the various ports in the cluster and distributes those statistics to each of the other nodes. One or more IP addresses can reside on each port. Each node determines a set of weights for the various IP addresses based on the statistics distributed to it. Each node uses the same algorithm to generate the weights, and therefore, each node determines the same set of weights for the set of network addresses. The weights are used to generate a weighted list of available IP addresses. In response to a client mount request, a DNS in a given node randomly indexes into the weighted address list to resolve requests to an IP address. The weights are chosen so that the DNS is likely to pick an IP address on a port that has a low load. Over time, this approach balances the mount requests across IP addresses and tends to direct clients toward IP addresses sitting on the ports/nodes with the most available capacity.

Instead of rotating through an address list (i.e. round-robin approach) or selecting the least-loaded IP address, this technique creates a weight for each of the IP addresses based on a combination of load metrics. It then uses a randomization function to select and return a weighted IP address, with those IP addresses that have a higher weight being more likely to be selected in response to a given DNS request. A single weighted IP address is returned by the selection, rather than a list. The metrics used to determine the weights are distributed to each node on the cluster. Each node on the cluster resolves name service requests using the same probability distribution.

Since the sum of identical probability distributions (one on each node) will produce a probability distribution that is the same as the original (but cluster-wide), it does not matter which node a client uses for name resolution. The distribution of results returned are exactly the same regardless of whether a client connects to the same node every time or alternates through all of the nodes in the cluster. This approach allows nodes to be added or to fail without affecting the distribution that the client sees. This distributed cluster-wide independence is not possible using round-robin without explicit synchronization between nodes.

The technique introduced here returns only a single IP address for each request (in contrast with BIND, for example). As such, the client will always (and only) receive the IP address that it should be mounting. This technique also relies very little upon the user's DNS infrastructure. Further, because each node in the cluster identically implements the DNS, there is no single point of failure for purposes of name resolution. That is, even if one or more nodes fail or become inaccessible, the system will not fail as long as at least one node (including its DNS) remains operative.

The statistics employed using the technique introduced here enable the balancing of individual port and node utilization, by influencing access (via weights) to IP addresses. The technique also prevents the return of stale IP addresses (IP addresses that have become inaccessible) and allows seamless addition of new IP addresses (e.g., for new nodes added to the cluster). In addition, this approach is highly scalable since, as new nodes are added to the cluster, they are also equipped with a DNS; there is no requirement of synchronization between nodes for DNS purposes.

Moreover, this approach provides reduced load sampling requirements. For example, since the technique does not always return the lowest loaded IP address during a given sampling period, the lowest loaded IP address during the previous sampling period will not always receive the most network traffic. As a result, a longer period of time between sampling periods can be used than with previous techniques.

Refer now to FIG. 1, which illustrates an example of a storage server node that can be used to implement the technique introduced here in a network storage cluster. The node 2 includes certain modules that operate in kernel layer 11 and other modules that operate in user layer 12. The kernel layer modules include a network module 13, a data module 14, and a cluster interconnect module 15. The user layer modules include a DNS 16, an address manager 17 and a management gateway 18. It can be assumed that every other node in the cluster also includes the above-mentioned modules. Note that any of the above-mentioned modules can be implemented in software and/or firmware in conjunction with programmable circuitry, or entirely in special-purpose hardwired circuitry, or in a combination of such forms. For any given node, all of the above-mentioned modules can be implemented within the same physical housing, or they can be distributed among two or more physically housings.

Referring first to the kernel layer modules, the main purpose of the network module 13 is to provide an interface to a client (or multiple storage clients) for purposes of receiving mount requests and data access requests (e.g., read and write requests) and other types of communications from the client, and transmitting responses to those requests/communications to the client. The network module 13 can include functionality for translating between one or more protocols used by the client and whatever internal protocol(s) may be used by the node 2.

The main purposes of the data module 14 include providing an interface to the physical storage media in a storage subsystem 4, to control data layout on the storage media, and responding to client-initiated read and write requests. The data module 14 can also include other functionality, such as the ability to create a backup, mirror image or snapshot of stored data. The data module 14 can include, for example, a file system manager to manage a file system or other form of organizing stored data.

The cluster interconnect module 15 allows the various nodes to communicate with each other via a cluster interconnect 6. Within the node 2, the cluster interconnect module 15 is operatively coupled to the network module 13, the data module 14 and the management gateway 18.

Referring now to the user layer modules, the main purpose of the management module 18 is to interface with a network administrator to allow the network administrator to control various management and administrative functions of the node 2. Such control may be accomplished in certain situations via a management gateway in another node and the cluster interconnect 6.

In addition, according to the technique introduced here, the management gateway 18 includes a gatherer module 19. The gatherer module 19 periodically gathers and/or computes statistics regarding CPU utilization and throughput for all of the IP addresses of all of the nodes 2 in the cluster. For remote nodes, that information is requested and received via the cluster interconnect 6, by using, for example, a series of remote procedure calls (RPCs).

The address manager 17 is responsible for receiving the gathered statistics from the management gateway 18 as they become available, applying the statistics to a weight algorithm (e.g., a set of formulas) to generate a set of weights, and creating a weighted list 20 (e.g., a file) of the available IP addresses of the cluster available for client mount requests, based on those weights. The weighted list 20 of available IP addresses may be maintained internally within the node 2, or it may be maintained at any convenient external location. In one embodiment, each node 2 in the cluster maintains its own identical weighted address list 20. In another embodiment, each node 2 uses the same (single) weighted address list 20.

The DNS 16 performs name service resolution in response to client mount requests, by randomly selecting an IP address from the weighted address list 20. In one embodiment, the DNS 16 uses a random number generator to generate an index value used to select an address from the weighted address list 20. This functionality is discussed further below. The DNS 16 may implement a modified version of BIND, i.e., BIND modified to perform the aforementioned functions. Each time the address manager 17 updates the weighted address list 20 (i.e., based upon a newly computed set of weights), the address manager 17 notifies the DNS 16, to cause the DNS 16 to access the updated version of the weighted address list 20.

The management gateway 18 can also detect that an IP address has been disabled by an administrator (since management related user inputs are normally input to a node 2 via its management gateway 18). In response to such detection, the management gateway 18 will send a message to each other management gateway 18 in the cluster, signaling that the particular IP address is disabled/inaccessible. That triggers the address manager 17 in each node to update its DNS 16. The address manager 17 in each node recalculates the IP address weights based on the statistics that it had from the last sample period (although it has removed the disabled/inaccessible IP address.)

Figure 2:
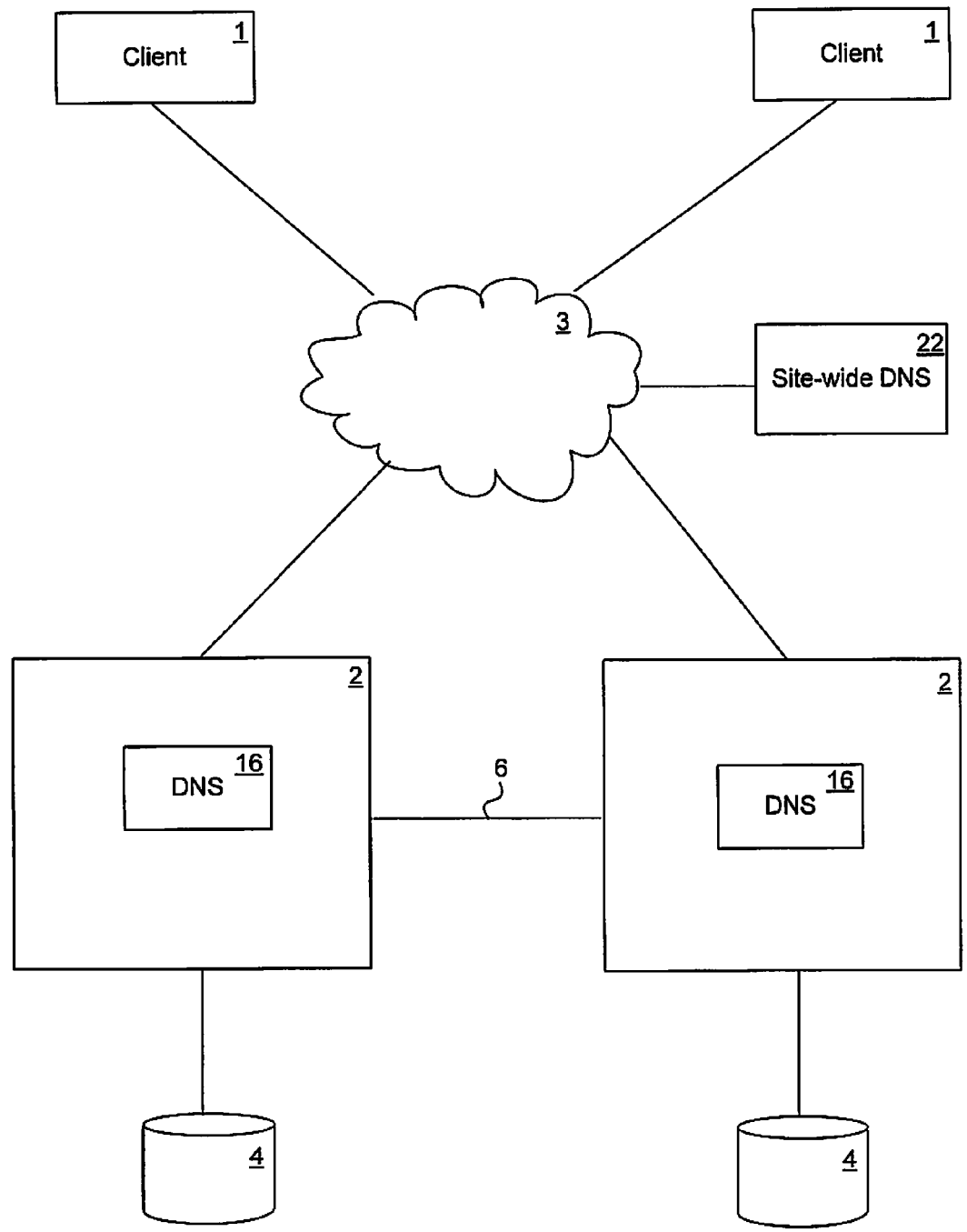
FIG. 2 illustrates a network storage cluster.

FIG. 2 illustrates an example of a storage cluster in which the above described technique and node can be implemented. The cluster includes multiple storage server nodes 2, which can communicate with multiple storage clients 1 through an interconnect 3. Although only clients 1 and two storage server nodes 2 are illustrated, it will be understood that a storage cluster in accordance with the technique introduced here is not limited to any particular number of clients 1 and/or storage server nodes 2.

Each node 2 is coupled to its own storage subsystem 4 and is responsible for managing the data stored in that storage subsystem. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Each node 2 receives and responds to various read and write requests from the clients 1, directed to data stored in or to be stored in a storage subsystem 4. Each storage subsystem 4 includes a number of nonvolatile mass storage devices, which can be, for example, conventional magnetic or optical disks or tape drives; alternatively, they can be non-volatile solid-state memory, such as flash memory, or any combination of such devices. The mass storage devices in a storage subsystem 4 can be organized as a Redundant Array of Inexpensive Disks (RAID), in which case a node 2 accesses the storage subsystem 4 using a conventional RAID algorithm for redundancy.

Each node 2 is connected to every other node 2 in the cluster through the cluster interconnect 6. The cluster interconnect 6 may be a direct connection, or it may include one or more networks and/or intermediary communication devices.

In certain embodiments, each client 1 directs its read and write requests by default to one particular node 2. However, that node may forward the request to another node (through the cluster interconnect 6), depending upon loading and/or where the target data is stored.

A site-wide DNS 22 also is coupled to interconnect 3. The site-wide DNS 22 is separate from the DNS 16 implemented in each node 2. In an implementation which does not employ the technique introduced here, a site-wide DNS would normally respond directly to client DNS requests (e.g., associated with mount requests) by returning an IP address to the requesting client. However, with the technique introduced here, the site-wide DNS 22 merely receives and forwards any DNS request it receives to an IP address of a node 2 in the cluster. The DNS 16 within that node then resolves the request. The site-wide DNS 22 may have an administrator-specified list of IP addresses in the cluster, from which it can select for purposes of forwarding a DNS request.

Figure 3:
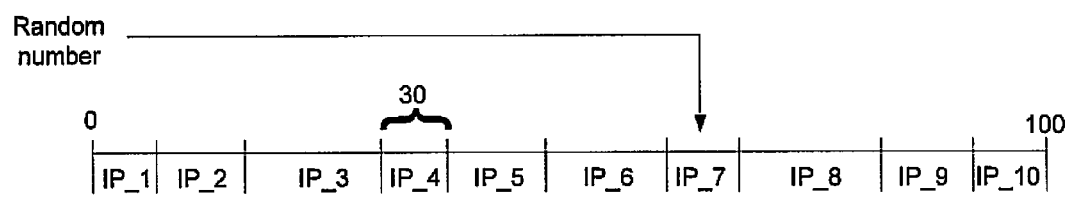
FIG. 3 illustrates conceptually a technique of using a random weighted distribution to select an IP address.

As mentioned above, the DNS 16 in any particular node 2 uses a weighted random distribution to resolve a DNS request to an IP address. FIG. 3 illustrates this technique. Assume for purposes of explanation that the weighted address list 20 contains 10 IP addresses, IP_1, IP_2, . . . , IP_10. The entire weighted address list 20 is mapped to a predefined range of numbers that a particular random number generator can generate. For purposes of this description, it is assumed that the random number generator to be used can generate any whole number within a range of zero to 100. Each IP address in the list is mapped to a separate subrange 30 (i.e., one or more numbers within) the entire range of numbers. In response to a DNS request, the DNS 16 within a node 2 uses the random number generator to generate a random number, and the DNS 16 then selects the IP address of the subrange within which that random number falls.

IP addresses are weighted in order to affect the likelihood that any particular address will be selected in response to a DNS request. The weight of an address can be adjusted by adjusting the size of the subrange (of the number range) to which the address is mapped. For example, to weight a particular address more heavily, the subrange of numbers to which the address is mapped is increased (to include more numbers), whereas to weight and address less heavily, the subrange of numbers to which the address is mapped is decreased (to include fewer numbers). Thus, changing the size of a subrange to which an IP address is mapped changes the probability that that particular IP address will be selected in response to a given DNS request, relative to the other IP addresses in the weighted list 20. Referring still to FIG. 3, if all of the subranges 30 are the same size, then each IP address in the address list 20 will have the same likelihood of being selected in response to a given DNS request.

In one embodiment, all weights are scaled to percentages, such as percentage of CPU cycles used, percentage of network throughput used, etc. This flexibility allows the weighting algorithm (discussed below) to work in a cluster that has nodes with different processing power and/or available throughput. In addition, weights can be based on available capacity rather than how much capacity each IP address is currently consuming. Note that if the goal is to optimize port usage, it is acceptable to have one IP address handling a very heavy load at any particular time, since multiple IP addresses can reside on any given port If all nodes in the cluster have the same capabilities, this approach will have the effect of balancing network traffic in an even fashion. However, if one node (or port) in the cluster has a much greater CPU capacity or throughput capacity than the other nodes (e.g., roughly an order of magnitude greater or more), then it may not be desirable to balance the load evenly through different IP addresses. In such a case, it may be desirable for the IP address(es) on that node/port to have more connections/greater load.

In one embodiment, the following formulas are used to compute a weight for each IP address:

CPU weight: cpu_weight=100.0−(% of CPU being used)/Number of IP addresses on node where IP address resides)

Throughput weight: thpt_weight=100.0−(% of port throughput being used)/Number of IP addresses on port where IP address resides)

Final weight: final_weight=(thpt_weight+cpu_weight)/2

Here, final_weight is the weight which is applied to an IP address; referring to FIG. 3, it is the value which determines the size of the subrange to which the corresponding IP address is mapped.

The "% of CPU being used" value (CPU utilization) is an instantaneous value measured at, for example, predetermined intervals, such as every five minutes. Throughput can be measured by the kernel layer (e.g., by the port address during sample period.

So, for example, if the CPU on a node is idle, there is only one port on the node and there is no traffic on the port, then the weight of a given IP address on that port is computed as:

cpu_weight=(100.0−0)/1=100.0 thpt_weight=(100.0−0)/1=100.0 final_weight=(100+100)/2=100.0

If there are two IP addresses on the same port, then both will have a weight of "50":

cpu_weight=(100.0−0)/2=50.0 thpt_weight=(100.0−0)/2=50.0 final_weight=(50+50)/2=50.0

Since these weights are equal, there will be an equal probability of each address being selected in response to a DNS request.

As another example, assume there are two IP addresses with the same throughput, say 0.5 Gbit/sec, but one IP address ("IP_1") is on a 10 Gbit/sec port while the other ("IP_2") is on a 1 Gbit/sec port. IP_1 (on the 10 Gbit/sec port) will have a lower throughput utilization (0.5 Gbit/sec is 5% of a 10 Gbit/sec port):

cpu_weight=(100.0−0)/1=100.0 thpt_weight=(100.0−5)/1=95.0 final_weight=(100+95)/2=97.5

For IP_2:

cpu_weight=(100.0−0)/1=100.0 thpt_weight=(100.0−50)/1=50.0 final_weight=(100+50)/2=75.0

Therefore, IP_1 gets a weight of 97 while IP_2 gets a weight of 75. This means that for every approximately 172 DNS requests serviced (97.5+75=172.5), 97 of them will produce IP_1 as the result and 75 of them will produce IP_2 as the result. While IP_2 may be produced as a result more often than one might expect, that is because the algorithm also balances the available CPU capacity.

The above algorithm can handle a wide range of cases where the various capacities are different, and where multiple IP addresses are on the same port of a node. In that sense, the algorithm is robust.

Figure 4A:
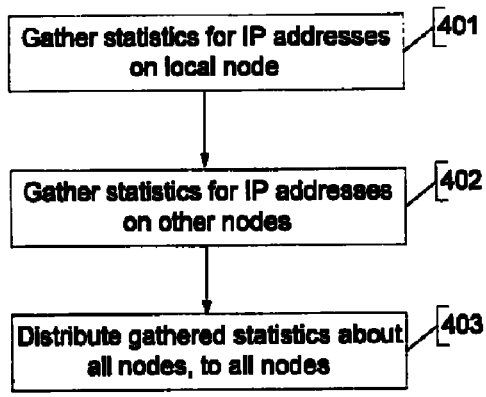
FIG. 4A illustrates a set of operations that can be performed in a master storage server node to gather statistics about resource utilization.
Figure 4C:
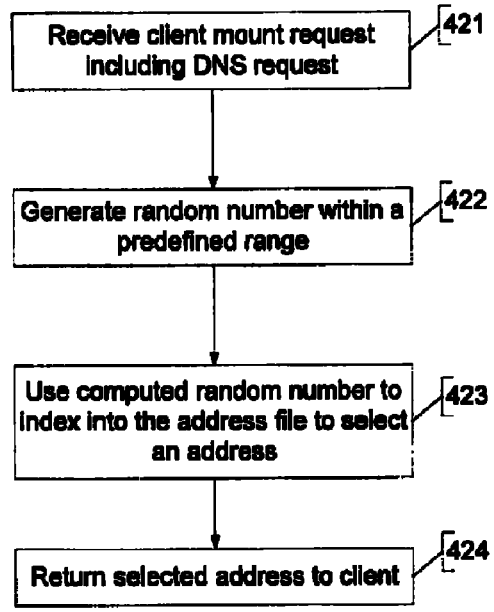
FIG. 4C illustrates a set of operations that can be performed in a storage server node to response to a DNS request.
Figure 4B:
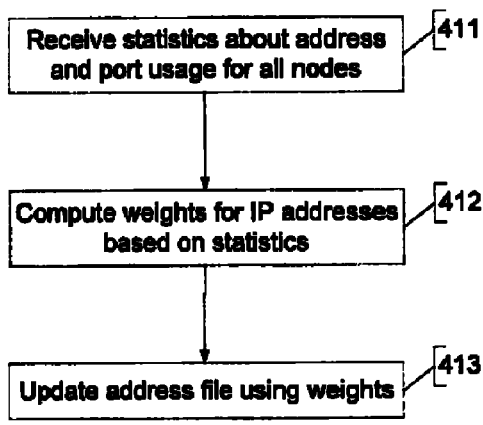
FIG. 4B illustrates a set of operations that can be performed in a storage server node to produce a weighted address list.

Refer now to FIGS. 4A, 4B and 4C, which illustrate process flows for implementing the technique introduced here. In practice, every node 2 in a cluster can include a gatherer module 19 (FIG. 1). Each node's gatherer module 19 gathers statistics such as described above on CPU utilization and throughput for the ports on that node. In one of the nodes 2, referred to as the master node, the gatherer module 19 also gathers these statistics from the management gateway 18 of each of other node in the cluster. It can be assumed that in the event the master node fails, another node will take over as the master node. The methods by which such a failure is detected and takeover occurs are not germane to the technique being introduced here.

FIG. 4A illustrates an example of the operations that may be performed by the master node. At 401, the gatherer module 19 in the master node computes and/or gathers statistics on CPU utilization and throughput for ports in the master node. A similar computation/gathering of statistics occurs in each of the other nodes by their respective gatherer modules 19, for the IP addresses in those nodes. Accordingly, at 402 the gatherer module 19 in the master node gathers those statistics from each of the other nodes 2. At 403 the gatherer module 19 in the master node then distributes the aggregated statistics to all of the other nodes 2. This process may be repeated periodically, such as every five minutes.

FIG. 4B shows the operations that occur on a node 2 other than the master node. The node 2 receives the statistics from the master node, relating to all the nodes 2, at 411. The management gateway 18 in that node then forwards the received statistics to the address manager 17 in that node, which at 412 computes weights for all of the available IP addresses of the cluster, based on the statistics, by using for example the weights algorithm (formulas) described above. The address manager 17 in that node 2 then updates the weights file based on those newly computed weights at 413, i.e., it adjusts the weights of one or more IP addresses in the weighted address list 20, as necessary. This process may be repeated periodically, such as every five minutes.

FIG. 4C illustrates the operations that may be performed in any node 2 in the cluster in connection with servicing a client DNS request. A DNS request may be received by a node 2 via the separate site-wide DNS 22 (FIG. 2). Initially, at 421 the node 2 receives a client DNS request. The network module 13 in the node 2 receives this request and forwards the DNS request to the DNS 16 within that node 2. At 422 the DNS 16 within the node 2 generates a random number within a predefined range. The DNS 16 then uses the generated random number at 423 as an index into the weighted address list 20 to select one of the available IP addresses, in the manner described above (regarding FIG. 3). The DNS 16 then returns the selected IP address to the requesting client at 424.

Figure 5:
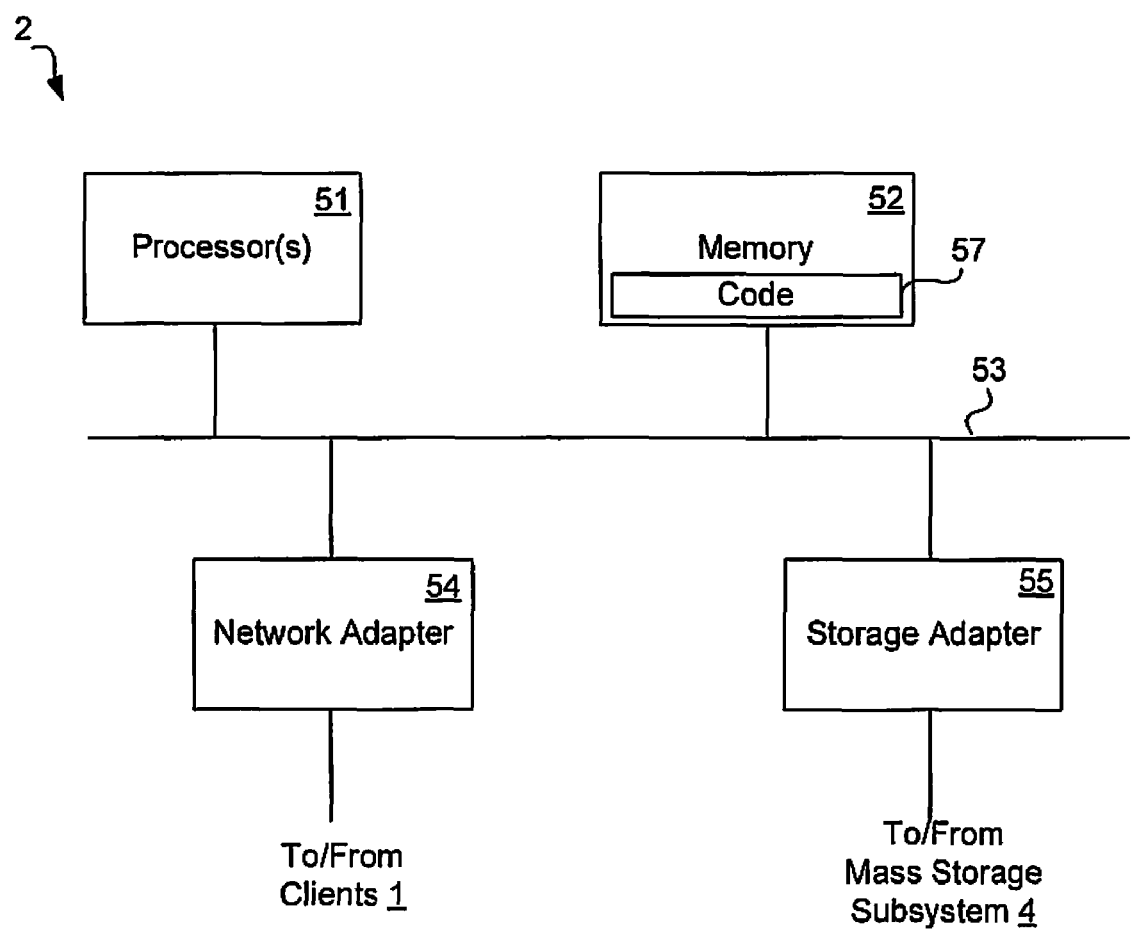
FIG. 5 is a high-level block diagram showing an example of the physical architecture of a storage server node.

FIG. 5 is a high-level block diagram showing an example of the physical architecture of a storage server node 2. The node 2 includes one or more processors 51 and memory 52 coupled to an interconnect 53. The interconnect 53 shown in FIG. 5 is an abstraction that represents any one or more separate physical buses, point-to-point connections, or both connected by appropriate bridges, adapters, or controllers. The interconnect 53, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 51 is/are the central processing unit (CPU) of the node and, thus, control the overall operation of the node. In certain embodiments, the processor(s) 51 accomplish this by executing software or firmware stored in memory 52. The processor(s) 51 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 52 is or includes the main memory of the node. The memory 52 represents any form of random access memory (RAM), read-only memory (ROM), flash memory, or the like, or a combination of such devices. In use, the memory 52 may contain, among other things, code 57 embodying one or more of the various modules shown in FIG. 1.

Also connected to the processor(s) 51 through the interconnect 53 are a network adapter 54 and a storage adapter 55. The network adapter 54 provides the node with the ability to communicate with remote devices, such as hosts 1, over the interconnect 3 and may be, for example, an Ethernet adapter or Fibre Channel adapter. The storage adapter 55 allows the node to access its local storage subsystem and may be, for example, a Fibre Channel adapter or SCSI adapter.

Thus, a method and apparatus for load-derived probability-based domain name service in a network storage cluster have been described. The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   implementing a domain name service (DNS) within a network storage cluster that includes a plurality of storage server nodes;
   communicating between the storage server nodes to determine a weighted random distribution; and
   load balancing between the storage server nodes in the network storage cluster, by using the weighted random distribution to resolve client name service requests to network addresses in the network storage cluster, wherein the load balancing includes using said weighted random distribution in each of the plurality of storage server nodes to determine a same set of weights in each node, for a set of network addresses of the network storage cluster.

2. A method as recited in claim 1, wherein using a weighted random distribution to resolve client name service requests comprises randomly indexing into a weighted list of available network addresses.

3. A method as recited in claim 1, wherein the DNS is implemented in two or more storage server nodes in the network storage cluster.

4. A method as recited in claim 3, wherein the DNS is implemented in each of the storage server nodes in the network storage cluster.

5. A method as recited in claim 4, wherein the weighted random distribution is implemented identically in each of the storage server nodes in the network storage cluster.

6. A method as recited in claim 3, wherein the weighted random distribution is implemented identically in each of the two or more storage server nodes in the network storage cluster.

7. A method as recited in claim 1, further comprising resolving client name service requests to load balance between different ports on a particular storage server node in the network storage cluster.

8. A method as recited in claim 1, wherein the DNS returns a single network address in response to each client name service request.

9. A method as recited in claim 1, further comprising:
   gathering statistics at a storage server node in the network storage cluster, relating to throughput and central processing unit ("CPU") utilization, for each of a plurality of network addresses in the network storage cluster; and
   distributing the statistics from said storage server node to each of the other storage server nodes in the network storage cluster.

10. A method as recited in claim 9, further comprising:
    determining in each of the storage server nodes a set of weights for the plurality of network addresses, based on the distributed statistics, wherein each of the storage server nodes determines the same set of weights for the plurality of network addresses.

11. A method as recited in claim 10, wherein determining the set of weights comprises, for each of the plurality of network addresses:

computing a first value corresponding to a percentage of CPU capacity being used;
computing a second value corresponding to a percentage of throughput capacity being used; and
computing a third value as a function of the first value and the second value.

12. A method as recited in claim 1, further comprising:
detecting that a network address has been disabled by an administrator; and
removing a network address from a list of candidate network addresses in response to detecting that the network address has been disabled by an administrator.

13. A method comprising:
gathering statistics, at a storage server node in a network storage cluster that includes a plurality of storage server nodes, the statistics relating to central processing unit ("CPU") utilization and throughput for each of a set of ports in the network storage cluster;
distributing the statistics from said storage server node to each of the other storage server nodes in the network storage cluster;
in each of the storage server nodes in the network storage cluster, determining a set of weights for a set of network addresses of the network storage cluster, based on the distributed statistics, wherein each of the storage server nodes determines the same set of weights for the set of network addresses;
in each of the storage server nodes in the network storage cluster, creating a weighted list of available network addresses, based on the set of weights;
receiving a client name service request at one of the storage server nodes; and
in response to the client name service request, randomly indexing into the weighted list in said one of the storage server nodes, to resolve the client name service request to a network address in the network storage cluster.

14. A method as recited in claim 13, further comprising resolving the client name service request to load balance between different ports on a particular storage server node in the network storage cluster.

15. A method as recited in claim 13, further comprising:
detecting that a network address has been disabled by an administrator; and
removing a network address from a weighted list of available network addresses in response to detecting that the network address has been disabled by an administrator.

16. A method as recited in claim 13, wherein the statistics comprise, for each of a plurality of network addresses of the network storage cluster:
a first statistic corresponding to a percentage of CPU capacity being used; and
a second statistic corresponding to a percentage of throughput capacity being used.

17. A system comprising:
a plurality of storage server nodes coupled to each other to form a network storage cluster, and
a domain name server (DNS) implemented by each storage server node in the network storage cluster,
wherein each of the storage server nodes is capable of resolving a client mount request containing a host name to a network address in the network storage cluster, by using a weighted random distribution,
wherein each of the storage server nodes uses said weighted random distribution to determine a same set of weights in each node, for a set of network addresses of the network storage cluster.

18. A system as recited in claim 17, wherein using a weighted random distribution comprises randomly indexing into a weighted list of network addresses.

19. A system as recited in claim 17, wherein each of the storage server nodes uses an identical copy of said weighted random distribution.

20. A system as recited in claim 17, wherein the DNS returns a single network address in response to each client name service request.

21. A system as recited in claim 17, wherein each of the storage server nodes further comprises:
a gatherer to gather statistics relating to CPU utilization and throughput for each of a plurality of ports in the network storage cluster and to distribute the statistics to another storage server node in the network storage cluster; and
a virtual interface manager to determine a set of weights for a set of network addresses of the network storage cluster, based on the distributed statistics and to provide the weights as input for forming a weighted list of network addresses.

22. A system as recited in claim 21, wherein the statistics comprise, for each of a plurality of network addresses of the network storage cluster:
a first statistic corresponding to a percentage of CPU capacity being used; and
a second statistic corresponding to a percentage of throughput capacity being used.

23. A processing system usable as a storage server node in a network storage cluster that includes a plurality of storage server nodes, the processing system comprising:
a processor;
a network interface, coupled to the processor, through which to communicate with a remote processing system over a network; and
a memory accessible to the processor and storing code which embodies:
a gatherer to gather statistics relating to CPU utilization and throughput for each of a set ports in the network storage cluster and to distribute the statistics to another storage server node in the network storage cluster;
a virtual interface manager to determine a set of weights for a set of network addresses of the network storage cluster, based on the distributed statistics and to provide the weights as input for forming a weighted list of available network addresses,
wherein each of the plurality of storage server nodes forms the same weighted list of available network addresses; and
a domain name server (DNS) to respond to a client name service request, by randomly indexing into the weighted list to resolve the client name service request to a network address in the network storage cluster.

24. A processing system as recited in claim 23, wherein each of the storage server nodes determines the same set of weights for the set of network addresses.

25. A processing system as recited in claim 23, wherein the DNS resolves the client name service request to load balance between different ports on a particular storage server node in the network storage cluster.

26. A processing system as recited in claim 25, wherein the set of weights are determined by, for each of a plurality of network addresses of the network storage cluster:
computing a first value corresponding to a percentage of CPU capacity being used;
computing a second value corresponding to a percentage of throughput capacity being used; and
computing a third value as a function of the first value and the second value.

* * * * *